Dec. 13, 1966  C. J. CRANE  3,292,176

HEIGHT INDICATING SYSTEM FOR AIRCRAFT

Filed Feb. 18, 1964

INVENTOR
*CARL J. CRANE*

BY

ATTORNEY

United States Patent Office 3,292,176
Patented Dec. 13, 1966

3,292,176
HEIGHT INDICATING SYSTEM FOR AIRCRAFT
Carl J. Crane, Box 116, Helotes, Tex.
Filed Feb. 18, 1964, Ser. No. 345,807
4 Claims. (Cl. 343—108)

This invention relates to a system and structure for indicating the height of an aircraft while engaged in low altitude approach-landing procedure particularly during blind flight conditions.

The problem of precise altitude indication by means of radio altimetry is not only one of technical accuracy of the radio altimeter, but a psychosomatic one for the pilot, especially while engaged in the procedure of effecting a manually controlled blind landing.

The instrument which is commonly used in making a low approach to a blind landing utilizing the ILS system is the cross-pointer indicator, or other flight director type of instruments which are responsive to the runway localizer and the glide slope receivers.

The grave problem attendant upon making a full blind landing involves, among other difficulties, that of the actual touchdown to the runway while utilizing the glide slope and its indicator, and while watching the various other instruments that define proper aircraft control.

Each different type of aircraft requires different "handling" during the flare-out just prior to touchdown. Some are fast to land while others require only a short runway length. The normal 3 degree glide slope can effectively accommodate most aircraft to an altitude of about 100 feet, but from that altitude to touchdown, both the speed, the flare configuration and distance factors of touchdown and roll are quite variable. It is also known that the normal visual landing is almost entirely an "eye ball" procedure in the proximity of the runway and it is this critical visual technique which has found no counterpart in instrument displays within the aircraft. For this reason principally, the blind landing to zero-zero conditions is prohibited now (1964) by Federal Regulations in the United States.

It is a purpose of this invention to provide means for using the contemporary radio altimeter of any precise design in a novel manner in order to utilize its value of exact height over the runway surface in order to provide a visual reference both usable and effective.

Another purpose of this invention is to provide an automatic switching means for transferring the indication of the glide slope pointer *from* the glide slope receiver *to* the output of the radio altimeter at the time and place where the transfer will be most effective to aid in effecting the blind landing.

In my Patent #2,685,226 entitled Aircraft Flight Control Optical Indicating Device it is demonstrated how the visual blending of the indicia of spatial (attitude and turn) reference with those of electronic indicia reporting the glide slope and runway localization can eliminate most of the psychosomatic stress produced by the burden of reading multiple instruments. However, as noted above, the dependence upon the indication of the glide slope receiver left much to be desired for effecting the complete blind landing.

Accordingly, it is another purpose of this invention to provide automatic switching of radio altimeter indication to the horizontal reference indicator of any flight director type of integrated instrument in which the glide slope receiver produces its indication in pure or rate computed form.

In order to understand how the above purposes may be accomplished in my invention reference is made to the accompanying drawing in which.

Figure 1:
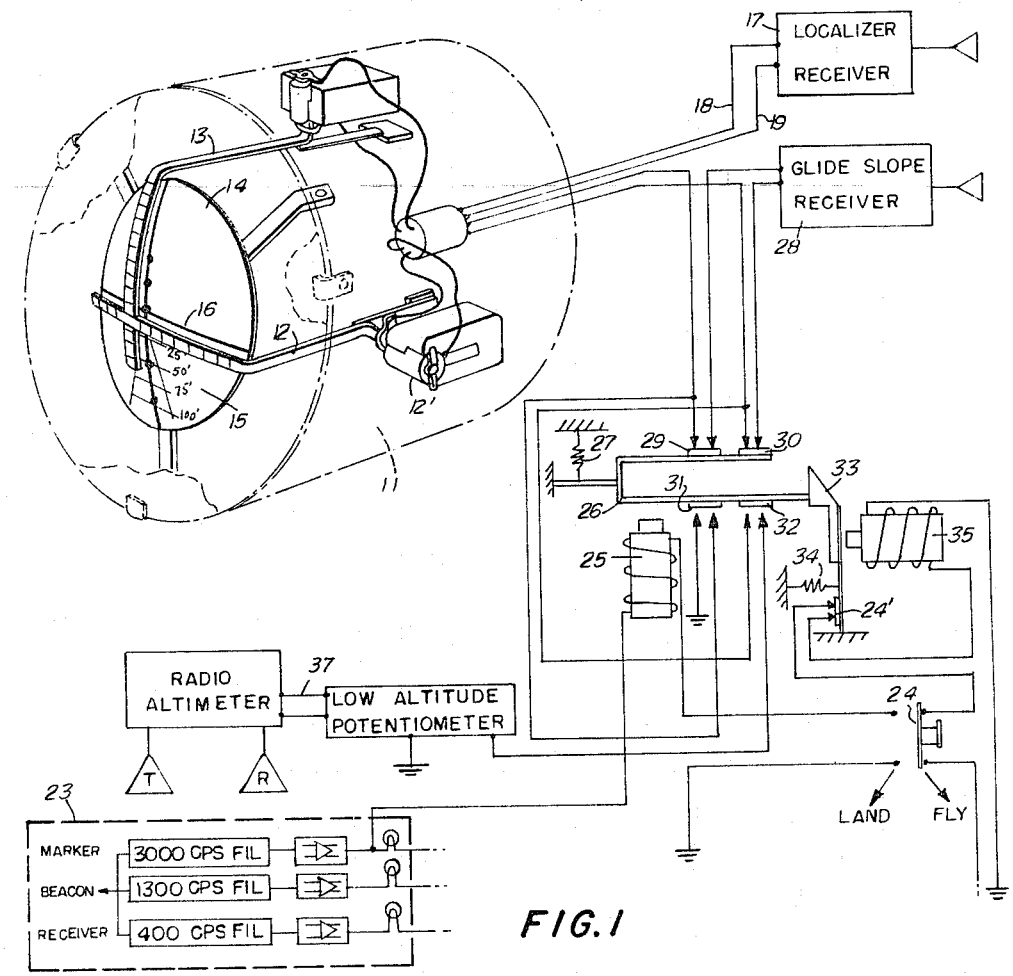
FIGURE 1 shows the structure and relationship of elements of the system.

Refer now to FIGURE 1 which shows the novel cross pointer indicator 11 which actually represents any contemporary instrument in which the horizontal pointer 12 and the vertical pointer 13 cross at a right angle configuration. The dial 14 in the instant invention is provided with a scale 15 which lies below the horizontal null index 16. This scale is arranged to serve the dual purpose of reporting the (1) normal above glide path indication and (2) radio altimeter height indication of the altitude from 100 feet to 0 feet. It will be noted that lighter lines parallel to the horizontal null index line 16 are arranged so that full scale (down) deflection of the glide slope pointer will serve to indicate (1) the usual divergence of approximately 150 micro amperes input to the meter from the glide slope receiver input as well as (2) 100 feet altitude above the runway for a like input of 150 micro amperes from the radio altimeter, in 25 foot decrements.

In FIGURE 1 the localizer receiver 17 is shown connected to the cross pointer indicator by means of the conductors 18 and 19 and no other switching of this circuit is considered important to the instant invention, although my patent noted above shows other utilization of the vertical pointer.

Figure 2:
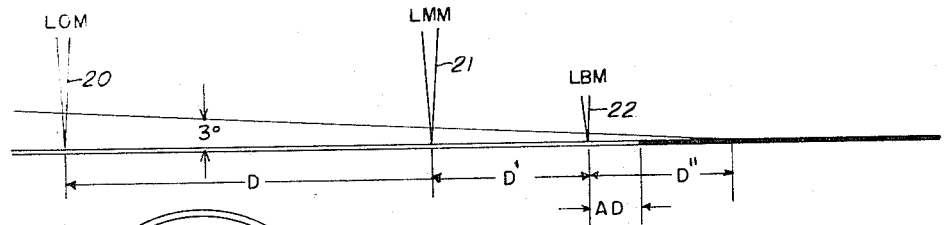
FIGURE 2 shows the modified ILS system which is utilized to produce the desired objective.

In order to understand the purpose of the remaining features of FIGURE 1, refer now to FIGURE 2 in which it will be noted that in addition to the outer marker 20, and the middle marker 21, there is shown the rarely used boundary marker 22 which for purpose of this invention is positioned so that an airplane following accurately the 3 degree glide slope will pass over the boundary marker at an altitude of 100 feet and in so doing would touch down 1920 feet from it, assuming no flare out or other change. Accordingly, to insure a satisfactory average touchdown point the distance AD (FIGURE 2) is selected to be about 1400 feet in order that the aircraft may cross the runway edge at least 30 feet high for an average touchdown approximately 600 feet after crossing the approach end of the runway.

The above suggested values are recited in order to demonstrate that the radiated space pattern of one or more boundary marker transmitters is used as follows. Refer to FIGURE 1 in which the numeral 23 refers to any modern marker beacon receiver responsive to the conventional three modulated frequencies which are transmitted by the standard 75 mc. marker beacons, be that either the airway marker (3000 c.p.s.), the outer marker (400 c.p.c.), the middle marker (1300 c.p.s.), or the boundary marker (3000 c.p.s.).

The instant invention provides a mode switch 24 so that for normal air route navigation the switch is positioned in the "fly" mode which permits the marker beacon receiver to operate in the normal manner so that its signal lamps respond to the crossing of any marker beacon in the usual manner.

However, if a blind landing or low approach is intended during which the radio altimeter is utilized then the mode switch 24 is shifted to "land" mode, which must be done just before approaching the outer marker 20 in preparation for the ILS approach. As the outer marker is traversed the blue lamp will respond and in similar manner the amber lamp will be illuminated when passing the middle marker 21. As the boundary marker 22 is passed in addition to the white lamp signal actuation, it will be noted that the glide slope pointer will instantly drop to read 100′ or less if the aircraft is at or below 100 feet.

This function is brought about by action of the lamp voltage (boundary marker) being coupled to the magnet coil 25 which moves the latching relay arm 26 against the spring 27 tension so that the circuit between the glide slope receiver 28 and the horizontal pointer is opened at the switch points 29 and 30 and closed at the points 31 and 32. The latch 33 under tension of springs 34 will keep this circuit closed between the radio altimeter output and the horizontal pointer 12 until the mode switch is again returned to the "fly" mode. Then the energized coil 35 will withdraw the latch 33 so that once again the glide slope receiver circuit is completed to the horizontal pointer galvanometer 12′.

The switch 24′ is normally open when the mode switch 24 is in the "fly" mode. When the mode switch is placed in "land" mode and subsequent to activation of coil 25 and latching of relay holding pawl 33 the switch 24′ is closed thus preparing coil 35 to be activated when again the switch 24 is placed in "fly" mode.

It can be seen then that the use of the instant invention when combined with an integrated flight director type of pilot reference instrument such as taught by reference to my patent noted above, will provide the pilot with a visual stimulus precisely similar to the "eye ball" stimulus of the clear weather landing.

Figure 3:
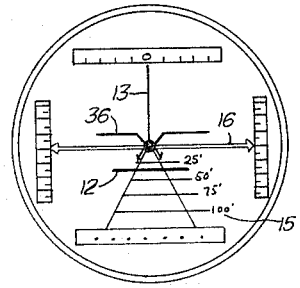
FIGURE 3 shows a schematic flight director type of integrated instrument.

For instance the pilot watching the lowering of altitude on the scale 15 actually "sees" the airplane index being approached in a manner to permit the pilot to "flare" his aircraft when and how best suits the type he is flying in accordance with the "seen" altitude of the airplane with reference to the approaching runway (pointer 12) as noted in FIGURE 3.

As shown in the figure the "runway" 12 standing at an indication of about 40 feet is approaching the landing wheels of the airplane index and as it approaches closely the pilot will flare, or increase the pitch attitude of the airplane index 36 until the horizontal pointer 12 becomes coincident with the null index 16 which in the flight director integration also serves the purpose of the artificial horizon reference.

In the instant invention the radio altimeter commonly identified as APN–22 is anticipated as a usable contemporary device by modifying it by use of a separate potentiometer circuit affixed to the servomotor shaft of this altimeter as exemplified at 37 of FIGURE 1. However, any radio altimeter circuit can be modified to supply an output of 150 micro amperes to cover the range 100 to 0 feet of altitude.

What is claimed is:

1. An aircraft height indicating system, comprising means for selectively displaying indication of aircraft proximity to an instrument landing glide slope path, as well as aircraft proximity to a landing runway, said means comprising a horizontal movable pointer, a dial swept by the said horizontal pointer, said dial portraying scale means common to glide slope measurement, said dial also portraying a horizontally delineated height reference scale, a horizontally displayed centrally positioned null line midway vertically of the said dial for establishing the zero height proximity of the landing runway to the aircraft, as well as for establishing the locus of the aircraft with respect to the said glide slope path, a galvanometer for driving the said pointer, the said galvanometer being connected by a switching means to either the output of a guide slope receive or to the output of a radio altimeter, a radio altimeter, a glide slope receiver, a marker beacon receiver, said marker beacon receiver output activating the said switching means to disconnect the said glide slope receiver from the said galvanometer when the aircraft traverses the energy pattern of a selected ground-based marker beacon transmitter and coupling a signal from said radio altimeter to said galvanometer representative of the height of the aircraft relative to the runway.

2. An aircraft height indicating system as set forth in claim 1 wherein said switching means comprises a latching relay which is energized by an output signal from said marker beacon receiver, said switching means being latched to electrically retained connection between said galvanometer and said radio altimeter output until manually released by an operator.

3. An aircraft height indicating system as set forth in claim 2 wherein said switching means is manually released by an operator energizing a solenoid.

4. An aircraft height indicating system as set forth in claim 1 wherein the signal from the radio altimeter which is representative of the aircraft height relative to the runway is derived from a potentiometer which is driven by said radio altimeter.

References Cited by the Examiner

UNITED STATES PATENTS

| | | | |
|---|---|---|---|
| 2,321,582 | 6/1943 | Crane et al. | 244—77 |
| 2,613,350 | 10/1952 | Kellogg | 343—108 |
| 2,682,051 | 6/1954 | Fisher | 343—108 |
| 2,841,345 | 7/1958 | Halpert et al. | 343—108 X |

CHESTER L. JUSTUS, *Primary Examiner.*

H. C. WAMSLEY, *Assistant Examiner.*